United States Patent
Jeon et al.

(10) Patent No.: US 10,794,475 B2
(45) Date of Patent: Oct. 6, 2020

(54) APPARATUS AND METHOD FOR TRANSMISSION CONTROL OF VEHICLE, AND VEHICLE SYSTEM

(71) Applicants: HYUNDAI MOTOR COMPANY, Seoul (KR); KIA MOTORS CORPORATION, Seoul (KR)

(72) Inventors: Byeong Wook Jeon, Seoul (KR); Kwang Hee Park, Suwon-si (KR); Jae Chang Kook, Hwaseong-si (KR); Sang Jun Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/429,770

(22) Filed: Jun. 3, 2019

(65) Prior Publication Data

US 2020/0149629 A1   May 14, 2020

(30) Foreign Application Priority Data

Nov. 9, 2018   (KR) .................. 10-2018-0137501

(51) Int. Cl.
*F16H 61/02*   (2006.01)
*F16H 61/00*   (2006.01)
*F16H 59/66*   (2006.01)

(52) U.S. Cl.
CPC ......... *F16H 61/0213* (2013.01); *F16H 59/66* (2013.01); *F16H 2059/663* (2013.01); *F16H 2059/666* (2013.01); *F16H 2061/0015* (2013.01); *F16H 2061/0216* (2013.01)

(58) Field of Classification Search
None
See application file for complete search history.

(56) References Cited

U.S. PATENT DOCUMENTS

| | | | | |
|---|---|---|---|---|
| 5,832,400 A | * | 11/1998 | Takahashi | B60W 30/1819 701/53 |
| 5,931,886 A | * | 8/1999 | Moroto | F16H 61/0213 701/54 |
| 6,070,118 A | * | 5/2000 | Ohta | G01C 21/26 701/65 |
| 6,516,261 B2 | * | 2/2003 | Ohashi | F16H 59/66 701/51 |
| 7,899,584 B2 | * | 3/2011 | Schricker | G08G 1/20 701/1 |

(Continued)

FOREIGN PATENT DOCUMENTS

| JP | 3277837 B2 | 2/2002 |
|---|---|---|
| KR | 10-1744781 B1 | 6/2017 |

*Primary Examiner* — Dirk Wright
(74) *Attorney, Agent, or Firm* — Morgan, Lewis Bockius LLP

(57) ABSTRACT

A transmission control apparatus may include a determination device that determines a predicted running load on a predetermined section of a road ahead of the vehicle by use of information regarding a grade and a curvature of the predetermined section of the road ahead of the vehicle and determines fuel consumptions for respective gears, based on the predicted running load, a determination device that determines a final gear, based on the determined fuel consumptions for respective gears, and a controller that performs gear shift control for the vehicle, based on the final gear.

21 Claims, 13 Drawing Sheets

(56) References Cited

U.S. PATENT DOCUMENTS

| | | | |
|---|---|---|---|
| 8,099,220 B2* | 1/2012 | Kim | F16H 61/0213 |
| | | | 701/65 |
| 8,700,256 B2* | 4/2014 | Duraiswamy | B60W 30/143 |
| | | | 701/36 |
| 9,297,455 B2* | 3/2016 | Li | F16H 61/00 |
| 10,113,637 B2* | 10/2018 | Sujan | F16H 61/16 |
| 10,203,031 B2* | 2/2019 | Gauthier | F16H 59/66 |
| 10,352,437 B2* | 7/2019 | Lee | B60W 40/072 |
| 2017/0159805 A1 | 6/2017 | Lee et al. | |

* cited by examiner

| | 1 SEC | 2 SEC | 4 SEC | 10 SEC | 20 SEC |
|---|---|---|---|---|---|
| ACCELERATION | $a_1$ | $a_2$ | $a_4$ | $a_{10}$ | $a_{20}$ |
| SPEED | $v_1$ | $v_2$ | $v_4$ | $v_{10}$ | $v_{20}$ |
| PREDICTED RUNNING LOAD | $RL_1$ | $RL_2$ | $RL_4$ | $RL_{10}$ | $RL_{20}$ |
| PREDICTED REQUIRED DRIVING FORCE | $F_1$ | $F_2$ | $F_4$ | $F_{10}$ | $F_{20}$ |
| PREDICTED FUEL CONSUMPTION (BSFC) 1ST GEAR | FE(1,1) | FE(1,2) | FE(1,4) | FE(1,10) | FE(1,20) |
| 2ND GEAR | FE(2,1) | FE(2,2) | FE(2,4) | FE(2,10) | FE(2,20) |
| 3RD GEAR | FE(3,1) | FE(3,2) | FE(3,4) | FE(3,10) | FE(3,20) |
| 4TH GEAR | FE(4,1) | FE(4,2) | FE(4,4) | FE(4,10) | FE(4,20) |
| 5TH GEAR | FE(5,1) | FE(5,2) | FE(5,4) | FE(5,10) | FE(5,20) |
| 6TH GEAR | FE(6,1) | FE(6,2) | FE(6,4) | FE(6,10) | FE(6,20) |
| 7TH GEAR | FE(7,1) | FE(7,2) | FE(7,4) | FE(7,10) | FE(7,20) |
| 8TH GEAR | FE(8,1) | FE(8,2) | FE(8,4) | FE(8,10) | FE(8,20) |

J-TH GEAR: $\min[FE(j,1)]$ $\min[FE(j,2)]$ $\min[FE(j,4)]$ $\min[FE(j,10)]$ $\min[FE(j,20)]$

GEAR (J) FOR EACH TIME POINT: $J_1$, $J_2$, $J_4$, $J_{10}$, $J_{20}$

FIG. 5B

APPARATUS AND METHOD FOR TRANSMISSION CONTROL OF VEHICLE, AND VEHICLE SYSTEM

CROSS-REFERENCE TO RELATED APPLICATION

The present application claims priority to Korean Patent Application No. 10-2018-0137501, filed on Nov. 9, 2018, the entire contents of which is incorporated herein for all purposes by this reference.

BACKGROUND OF THE INVENTION

Field of the Invention

The present invention relates to an apparatus and method for transmission control of a vehicle, and a vehicle system.

Description of Related Art

In general, an automatic transmission determines a gear based on a shift pattern in which shift areas are set in advance from the relationships between accelerator pedal strokes (APS) and vehicle speeds. A gear shift based on the shift pattern is unable to respond to a running load, and therefore a plurality of shift patterns have to be set for respective grades of roads.

However, the transmission of a vehicle calculates the grade of a road after the grade is actually changed, and maintains a previous shift pattern until detecting a grade variation to which a shift pattern based on the calculated grade is able to be effectively applied.

Therefore, it is difficult to immediately apply a shift pattern depending on a grade variation, and hence a delay in acceleration or a busy shift may occur, degrading fuel economy.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus and method for transmission control of a vehicle and a vehicle system that predict a running load and a required driving force according to the grade and/or the curvature of a section of a forward road that the vehicle will reach, and perform a gear shift into a gear corresponding to the lowest fuel consumption, based on the predicted running load and the predicted required driving force, facilitating the vehicle to cope with the condition of the forward road in advance and minimizing busy shift.

The technical problems to be solved as an exemplary embodiment of the present invention are not limited to the aforementioned problems, and any other technical problems not mentioned herein will be clearly understood from the following description by those skilled in the art to which the present invention pertains.

According to various aspects of the present invention, an apparatus configured for transmission control of a vehicle may include a calculation device that determines a predicted running load on a predetermined section of a road ahead of the vehicle by use of information regarding a grade and a curvature of the predetermined section of the road ahead of the vehicle and determines fuel consumptions for respective gears, based on the predicted running load, a determination device that determines a final gear, based on the determined fuel consumptions for respective gears, and a controller that performs gear shift control for the vehicle, based on the final gear.

The calculation device may determine a first running resistance according to the grade and a second running resistance according to the curvature and may determine the predicted running load on the predetermined section of the road ahead of the vehicle, from a sum of the first and second determined running resistances.

The calculation device may predict driving data at the time of travelling on the predetermined section of the road ahead of the vehicle, based on current driving data of the vehicle and may determine the predicted running load, based on the predicted driving data.

The calculation device may determine predicted running loads for respective predetermined time points between a current time point and a predicted time point at which the vehicle completely passes through the predetermined section of the road ahead of the vehicle.

The calculation device may determine predicted required driving forces according to the predicted running loads for the respective time points.

The calculation device may determine the fuel consumptions for the respective gears, based on the predicted required driving forces determined for each time point.

The determination device may determine a gear for the time point, based on the fuel consumptions for the respective gears.

The determination device may determine a gear corresponding to the lowest of the fuel consumptions for the respective gears to be the gear for the corresponding time point.

The determination device may assign weighting values to the respective gears for the respective time points and may determine a final gear, based on the average of the gears for the respective time points to which the weighting values are assigned.

The weighting values may increase with an approach to the current time point.

The apparatus may further include an information collection device that collects the information regarding the grade and the curvature of the predetermined section of the road ahead of the vehicle, from a navigation device.

According to various aspects of the present invention, a method for transmission control of a vehicle may include determining a predicted running load on a predetermined section of a road ahead of the vehicle by use of information regarding a grade and a curvature of the predetermined section of the road ahead of the vehicle and determining fuel consumptions for respective gears, based on the predicted running load, determining a final gear, based on the determined fuel consumptions for respective gears, and performing gear shift control for the vehicle, based on the final gear.

According to various aspects of the present invention, a vehicle system may include a navigation device and a transmission control apparatus that determines a predicted running load on a predetermined section of a road ahead of the vehicle by use of information regarding a grade and a curvature of the predetermined section of the road ahead of the vehicle, the information being collected from the navigation device, determines a final gear from fuel consumptions for respective gears that are determined based on the determined predicted running load, and performs gear shift control for the vehicle, based on the final gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B are views illustrating embodiments referred to in describing a gear selection operation according to fuel consumption by the transmission control apparatus according to an exemplary embodiment of the present invention;

Figure 1:
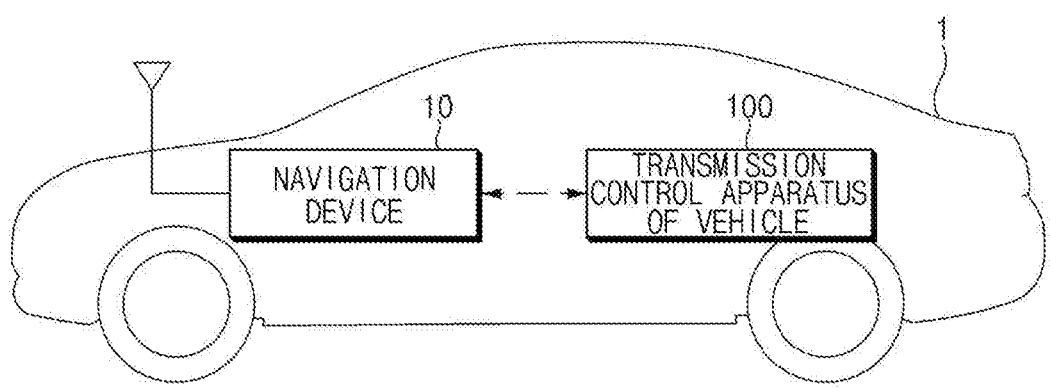
FIG. 1 is a view exemplarily illustrating a vehicle system to which a transmission control apparatus of a vehicle according to an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the other hand, the present invention(s) is/are intended to cover not only the exemplary embodiments, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view exemplarily illustrating a vehicle system to which a transmission control apparatus of a vehicle according to an exemplary embodiment of the present invention is applied.

Referring to FIG. 1, the vehicle system according to an exemplary embodiment of the present invention may include a navigation device 10 and a transmission control apparatus 100.

The navigation device 10 has a road map stored therein. The road map may include details of each road. For example, the road map may include information regarding the grade and/or the curvature of a predetermined section of the road.

The navigation device 10 may extract road information concerning a predetermined section of a road ahead of the vehicle of a vehicle 1 in a response to a request of the transmission control apparatus 100 and may provide the extracted road information to the transmission control apparatus 100.

The transmission control apparatus 100 collects the road information concerning the predetermined section of the road ahead of the vehicle, from the navigation device 10 and determines a gear at the time of travelling on the road, by use of the collected road information. The transmission control apparatus 100 determines a predicted running load on the predetermined section of the road ahead of the vehicle by use of information regarding the grade and the curvature of the predetermined section of the road ahead of the vehicle and determines a gear in which the fuel consumption is lowest at the time of travelling on the road, based on the determined predicted running load.

A detailed configuration and operation of the transmission control apparatus 100 will be described below with reference to FIG. 2.

The navigation device 10 and the transmission control apparatus 100 according to an exemplary embodiment of the present invention may be implemented within the vehicle 1. The navigation device 10 and the transmission control apparatus 100 may operate in conjunction with control units in the vehicle 1.

Figure 2:
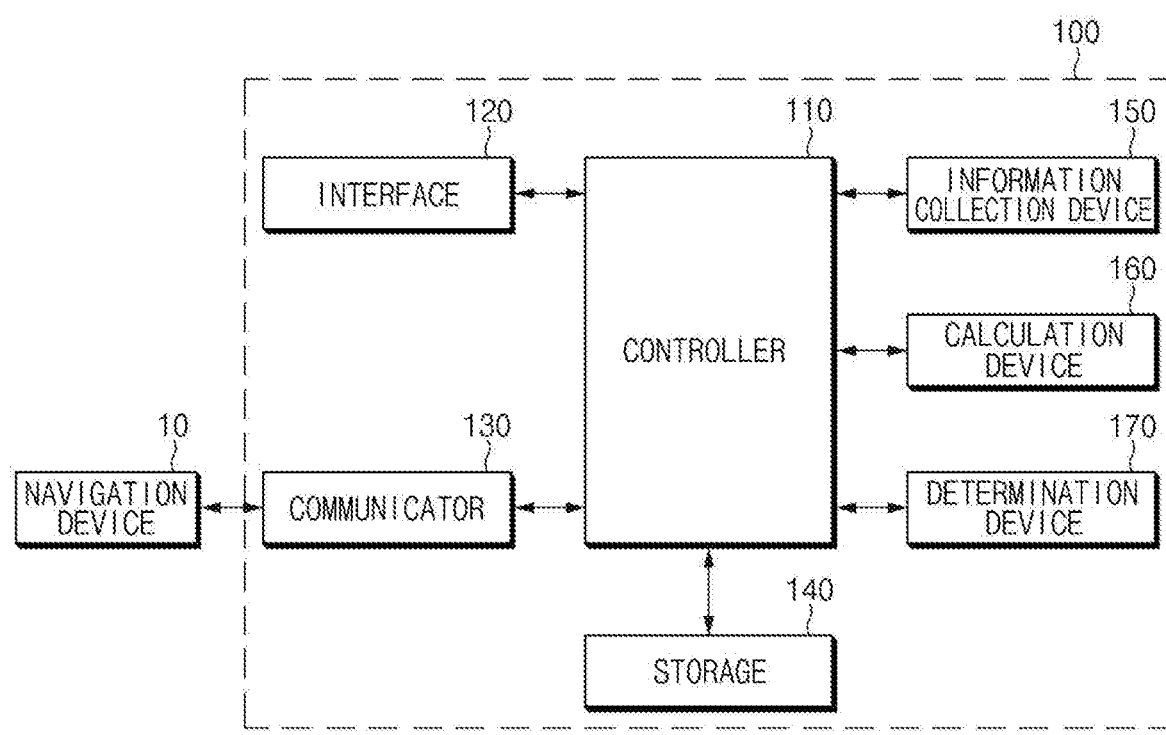
FIG. 2 is a view exemplarily illustrating a configuration of the transmission control apparatus of the vehicle according to an exemplary embodiment of the present invention.

FIG. 2 is a view exemplarily illustrating a configuration of the transmission control apparatus of the vehicle according to an exemplary embodiment of the present invention.

Referring to FIG. 2, the transmission control apparatus 100 may include a controller 110, an interface 120, a communicator 130, storage 140, an information collection device 150, a calculation device 160, and a determination device 170. The controller 110, the information collection device 150, the calculation device 160, and the determination device 170 of the transmission control apparatus 100 according to the present exemplary embodiment of the present invention may be implemented as at least one processor.

The interface 120 may include an input unit of receiving a control command from a user and an output unit of outputting operating states and outcomes of the transmission control apparatus 100.

The input unit may include a key button. The input unit may also include a mouse, a joystick, a jog shuttle, or a stylus pen. Furthermore, the input unit may include a soft key implemented on a display.

The output unit may include a display. The output unit may also include a sound output unit such as a speaker. In the case where the display is provided with a touch sensor such as a touch film, a touch sheet, or a touch pad, the display may operate as a touch screen and may be implemented in the form in which an input unit and an output unit are integrated with each other.

The display may include at least one of a liquid crystal display (LCD), a thin film transistor liquid crystal display (TFF LCD), an organic light-emitting diode (OLED) display, a flexible display, a field emission display (FED), and a three-dimensional (3D) display.

The communicator 130 may include a communication module that supports communication interface with electronic units and/or control units in the vehicle 1. For example, the communication module may establish a communication connection with the navigation device 10 of the vehicle 1 and may receive road information, such as the grade and/or the curvature of the road ahead of the vehicle, from the navigation device 10. Furthermore, the communication module may receive driving data (e.g., the speed, the acceleration, the APS, and the gear) of the vehicle 1 from the control units in the vehicle 1.

The communication module may include a module that supports vehicle network communication such as controller area network (CAN) communication, local interconnect network (LIN) communication, or Flex-Ray communication.

The communicator 130 may further include a communication module that supports wireless Internet access and/or a communication module that supports short range communication. Examples of the wireless Internet technology may include a wireless LAN (WLAN), wireless broadband (Wibro), Wi-Fi, and Worldwide Interoperability for Microwave Access (WiMAX), and examples of the short range communication technology may include Bluetooth, ZigBee, ultra wideband (UWB), radio frequency identification (RFID), and infrared data association (IrDA).

The storage 140 may store data and/or algorithms necessary for operating the transmission control apparatus 100. For example, the storage 140 may store commands and/or algorithms for determining a predicted running load and a predicted required driving force on a predetermined section of the road ahead of the vehicle, predicting fuel consumption according to the predicted required driving force, and determining a gear according to the predicted fuel consumption.

Furthermore, the storage 140 may store information received from the navigation device 10 and/or the control units of the vehicle 1.

The storage 140 may include a storage medium such as a random access memory (RAM), a static random access memory (SRAM), a read-only memory (ROM), a programmable read-only memory (PROM), or an electrically erasable programmable read-only memory (EEPROM).

The information collection device 150 collects information concerning the road ahead of the vehicle, from the navigation device 10 when the vehicle 1 starts to travel. The information collection device 150 may collect road information concerning a predetermined section of the road ahead of the vehicle with respect to the current location of the vehicle 1. The road information may include information regarding the grade and the curvature of the predetermined section of the road ahead of the vehicle.

The information collection device 150 may collect road information concerning a predetermined section of the road ahead of the vehicle in real time or every predetermined time period during the travel of the vehicle 1. For example, the information collection device 150 may collect road information concerning a 2-km section of the road ahead of the vehicle with respect to the current location of the vehicle 1.

The information collection device 150 stores the collected road information in the storage 140. Furthermore, the information collection device 150 may transfer the collected road information to the calculation device 160 and/or the controller 110.

The calculation device 160 determines a predicted running load on the predetermined section of the road ahead of the vehicle, based on the road information collected by the information collection device 150. The calculation device 160 may determine a running resistance according to the grade of the predetermined section of the road ahead of the vehicle and a running resistance according to the curvature of the road ahead of the vehicle and may determine the predicted running load using the determined running resistances.

Figure 3A:
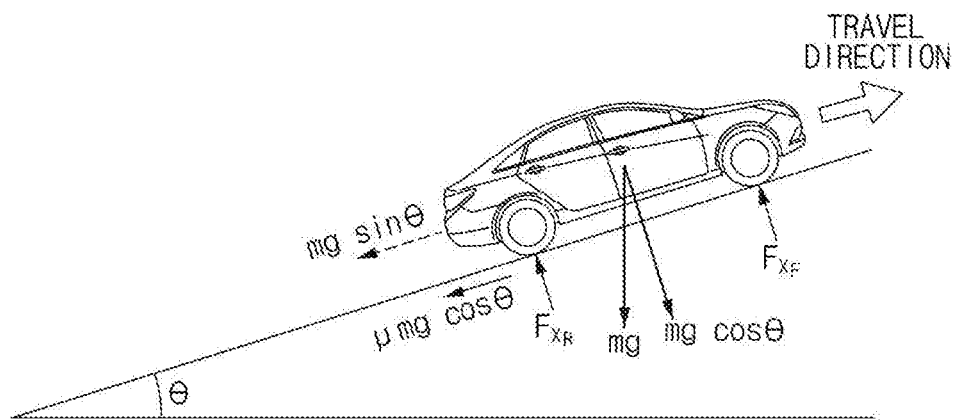
FIG. 3A, FIG. 3B, FIG. 4A, and FIG. 4B are views illustrating embodiments referred to in describing a running load determination operation of the transmission control apparatus according to an exemplary embodiment of the present invention.
Figure 3B:
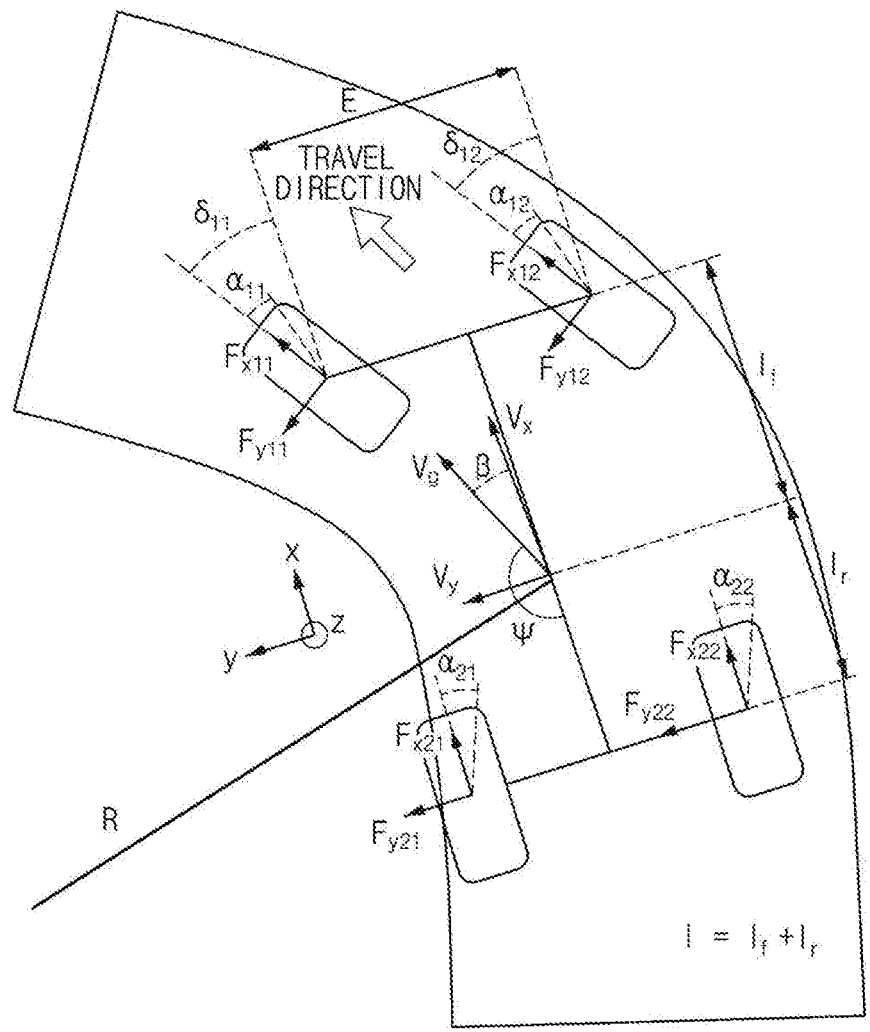

FIG. 3A is a view exemplarily illustrating an exemplary embodiment of determining a running resistance according to the grade θ of a road, and FIG. 3B is a view exemplarily illustrating an exemplary embodiment of determining a running resistance according to the curvature R of a road.

The calculation device 160 may derive Equation 1 with reference to FIG. 3A and FIG. 3B and may determine the predicted running load by applying the grade and the curvature to Equation 1 below.

$$RL_{predict} = \{\mu mg\cos\theta + mg\sin\theta\} + \left\{\frac{m^2}{2l^2} \times \left(\frac{l_r^2}{C_f} + \frac{l_f^2}{C_r}\right) \times \frac{v^4}{R^2}\right\} \quad \text{[Equation 1]}$$

In Equation 1, "$RL_{predict}$" denotes the predicted running load on the road ahead of the vehicle, "μ" denotes the coefficient of friction, "m" denotes the mass of the vehicle itself, "g" denotes the acceleration of gravity, "θ" denotes the grade of the road, "l ($=l_f+l_r$)" denotes the distance between the front wheels and the rear wheels, "$C_f$" and "$C_r$" denote the front cornering stiffness and the rear cornering stiffness, "v" denotes the speed of the vehicle, and "R" denotes the curvature of the road. The vehicle speed after k sec may be predicted and applied based on the current driving data of the vehicle 1.

Figure 4A:
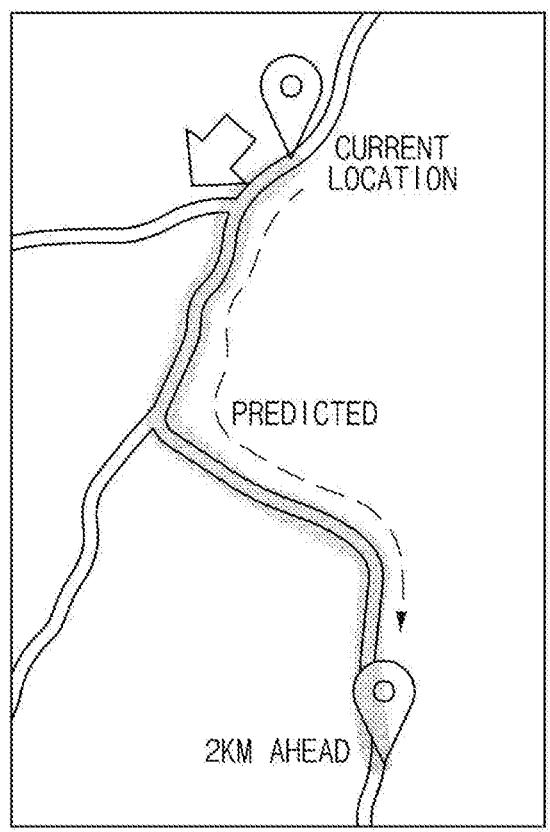
Figure 4B:
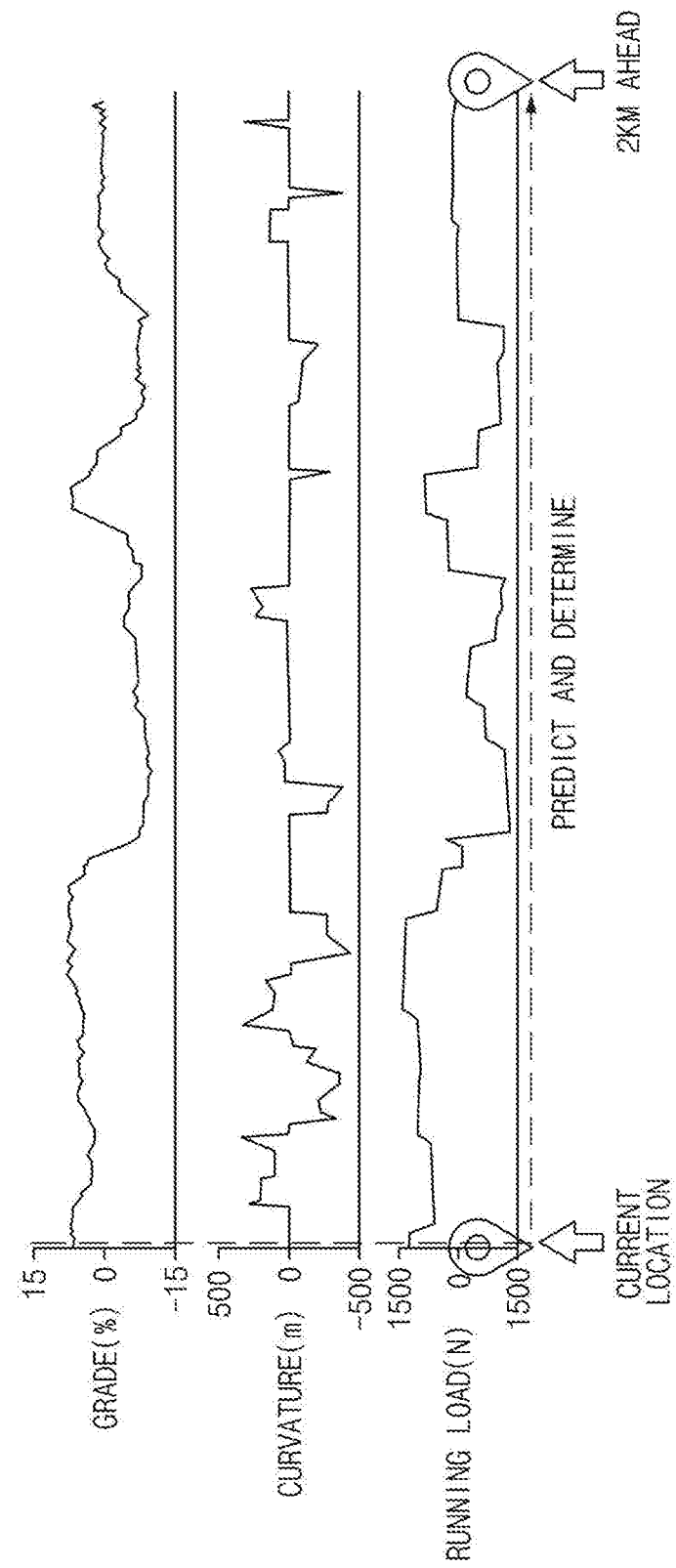

For example, in the case where the vehicle 1 travels along the path of a road as illustrated in FIG. 4A, the calculation device 160 may determine a predicted running load, based on road information, that is, the grade and the curvature of a 2-km section of the road ahead of the vehicle. The predicted running load may be represented as illustrated in FIG. 4B.

The calculation device 160 determines a predicted required driving force, based on the predicted running load determined for the predetermined section of the road ahead of the vehicle. The calculation device 160 may determine the predicted required driving force with reference to Equation 2 below.

$$F_{predict} = RL_{predict} + \frac{1}{2}C_d\rho A v^2 + (m + m_e)a \quad \text{[Equation 2]}$$

In Equation 2, "$F_{predict}$" denotes the predicted required driving force, "$RL_{predict}$" denotes the predicted running load, "$C_d$" denotes the drag coefficient, "$\rho$" denotes the density of air, "A" denotes the projected area of the vehicle body, "v" denotes the speed of the vehicle, "m" denotes the mass of the vehicle body, "$m_e$" denotes the equivalent mass of a rotating body, and "a" denotes the acceleration of the vehicle. The vehicle speed and the acceleration after k sec may be predicted and applied based on the current driving data of the vehicle 1.

Figure 5A:
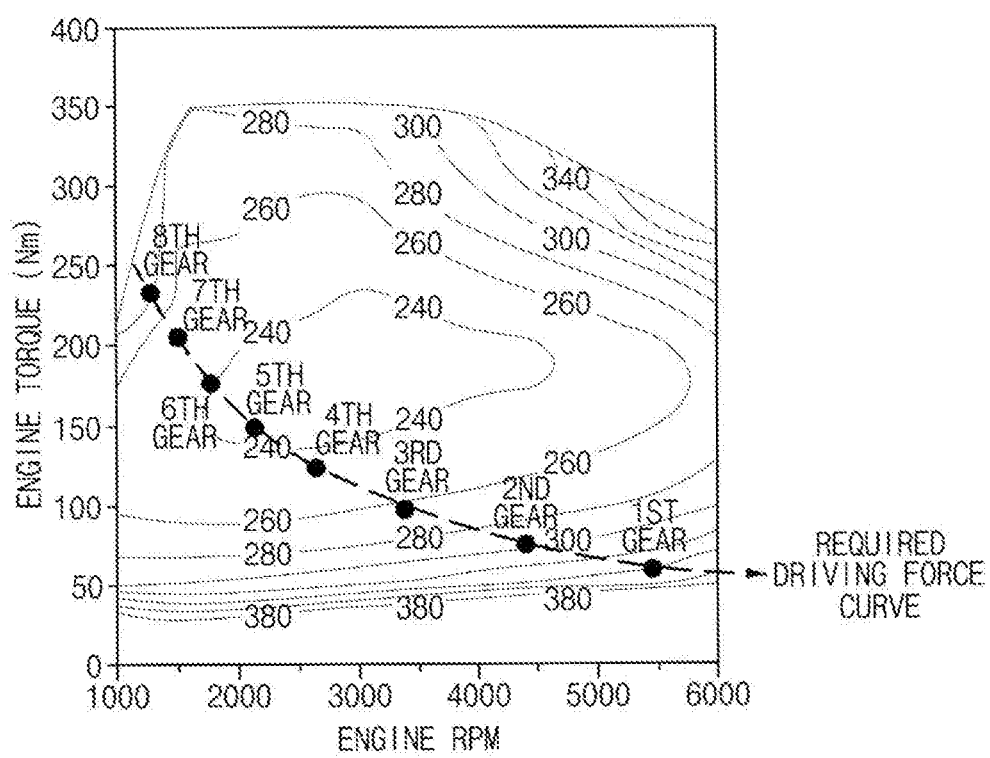

The predicted required driving force determined by the calculation device 160 may be represented as in the graph of FIG. 5A. As illustrated in FIG. 5A, the required driving force graph has a curve graph form which is inversely proportional to engine RPM and is proportional to engine torque.

The calculation device 160 determines fuel consumption, based on the predicted required driving force determined for the predetermined section of the road ahead of the vehicle. The calculation device 160 may determine fuel consumption for each gear.

The calculation device 160 may determine predicted running loads for respective predetermined time points between the current time point and the predicted time point at which the vehicle 1 completely passes through the predetermined section of the road ahead of the vehicle. For example, assuming that the vehicle 1 completely passes through the predetermined section of the road ahead of the vehicle in k sec, the calculation device 160 may determine predicted running loads for time t=1 sec, 2 sec, 4 sec, 10 sec, 20 sec, and k sec from the current time point. The calculation device 160 may determine predicted required driving forces for the respective time points, based on the predicted running loads determined for the respective time points.

The calculation device 160 determines fuel consumptions for respective gears, based on the predicted required driving force determined for each time point.

The fuel consumptions for the respective gears, which are determined based on the predicted required driving force for each time point, may be represented as illustrated in FIG. 5B.

FIG. 5B illustrates a table that shows predicted running loads and predicted required driving forces for time t=1 sec, 2 sec, 4 sec, 10 sec, and 20 sec from the current time point and predicted fuel consumptions for first to j-th gears at each time point.

The predicted fuel consumption for j-th gear after k sec may be represented by FE (j, k).

The determination device 170 determines a gear corresponding to the lowest of the fuel consumptions for the respective gears, which are determined by the calculation device 160, to be the gear for the corresponding time point. In FIG. 5B, the gear determined for time t=k sec may be represented by $J_k$.

Figure 6A:
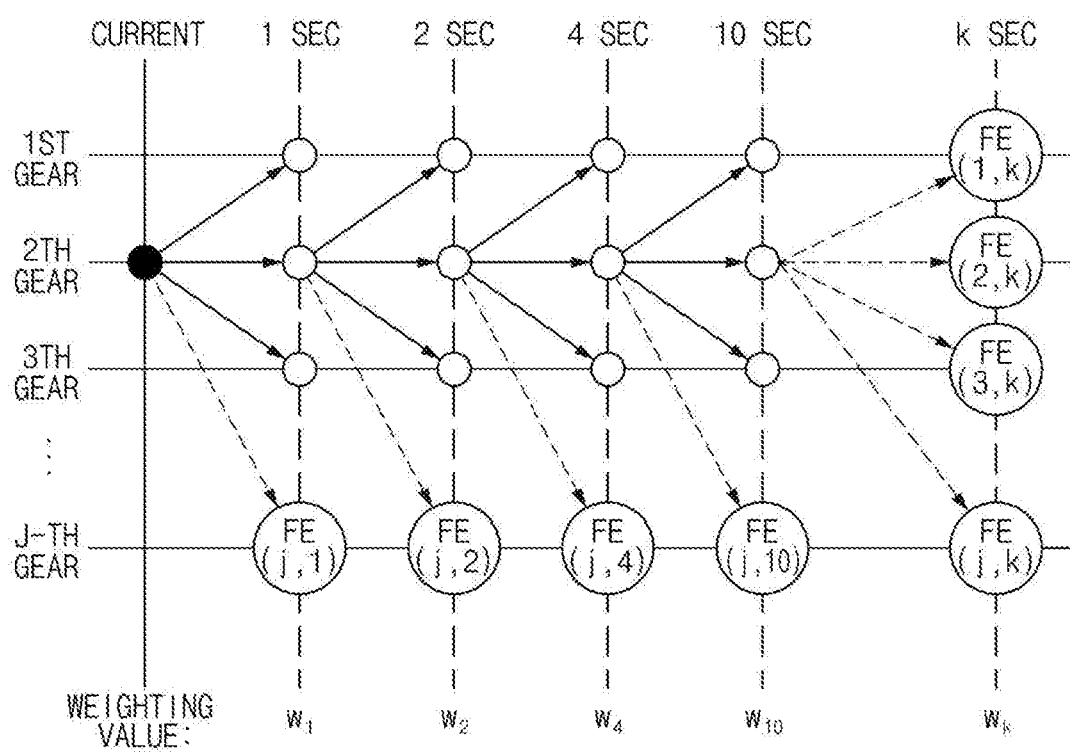
FIG. 6A, FIG. 6B, and FIG. 7 are views illustrating embodiments referred to in describing a final gear determining operation of the transmission control apparatus according to an exemplary embodiment of the present invention.

The determination device 170 assigns weighting values to the determined gears for the respective time points and to determine the final gear, based on the average of the gears for the respective time points to which the weighting values are assigned. FIG. 6A illustrates an exemplary embodiment of assigning weighting values to the gears for the respective time points.

The weighting values may be differently assigned according to the time points. The weighting values may increase with an approach to the current time point and may decrease away from the current time point. A variation in the weighting values assigned for the respective time points may be represented as illustrated in FIG. 6B.

Figure 6B:
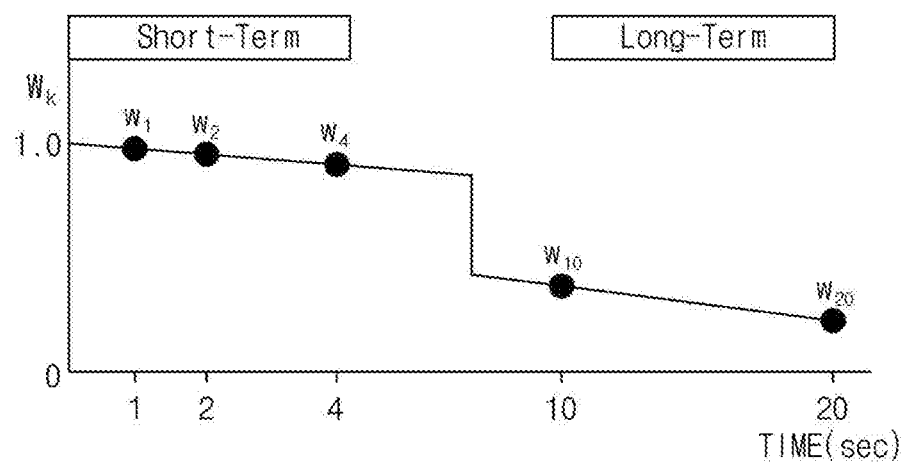

Referring to FIG. 6B, it may be seen that the weighting values assigned to the gears determined for time t=1 sec, 2 sec, and 4 sec are close to 1 and the weighting value assigned to the gear determined for time t=10 sec is smaller than or equal to one half.

The determination device 170 determines the final gear, based on the average of the gears for the respective time points to which the weighting values are assigned. The determination device 170 may determine the final gear with reference to Equation 3 below.

$$J_{OPT} = \text{INT}\left\{\sum_{i=1}^{n}\left(\frac{J_k \times w_k}{n}\right) + 0.5\right\} \quad \text{[Equation 3]}$$

In Equation 3, "$J_{OPT}$" denotes the final gear, "$J_k$" denotes the gear determined for time t=k sec, "$w_k$" denotes the weighting value assigned to the gear determined for time t=k sec, and "n" denotes the predetermined number of time points.

The controller 110 controls a gear shift for the vehicle 1, based on the final gear determined by the determination device 170. The controller 110 compares the current gear of the vehicle 1 and the determined final gear and performs a gear shift into the final gear when the current gear does not match the final gear.

As described above, the controller 110 performs the gear shift into the final gear before the vehicle 1 enters the predetermined section of the road ahead of the vehicle, facilitating the vehicle 1 to cope with the condition of the road ahead of the vehicle in advance.

The transmission control apparatus 100 of the vehicle 1 according to an exemplary embodiment of the present invention may consistently perform a series of operations of determining the final gear for the predetermined section of the road ahead of the vehicle and performing the gear shift control according to the determined final gear, while the vehicle 1 travels.

Figure 7:
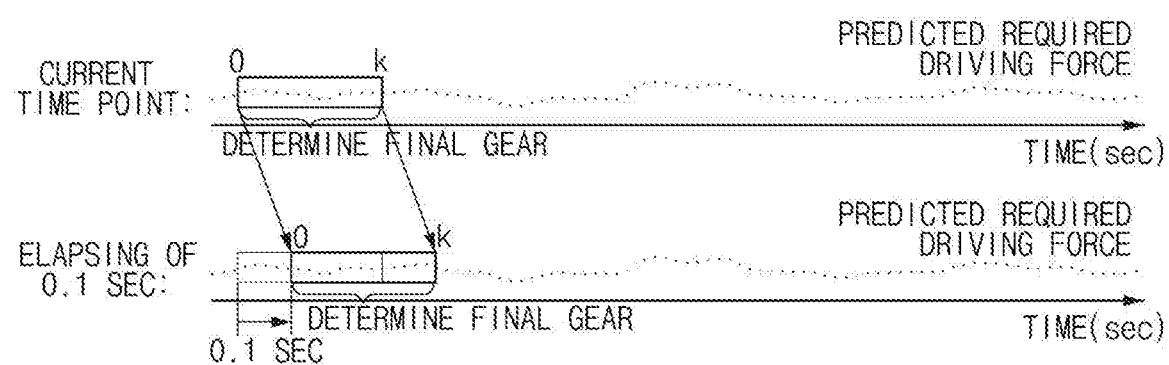

For example, as illustrated in FIG. 7, the transmission control apparatus 100 of the vehicle 1 may determine the final gear every 0.1 second and may perform gear shift control according to the determined final gear.

The transmission control apparatus 100 according to the exemplary embodiment of the present invention, which operates as described above, may be implemented in a form of an independent hardware device that includes a memory and a processor for processing each operation, and may be driven in the form included in another hardware device such as a microprocessor or a generic-purpose computer system.

Operations of the above-configured transmission control apparatus 100 according to an exemplary embodiment of the present invention will be described below in more detail.

Figure 8:
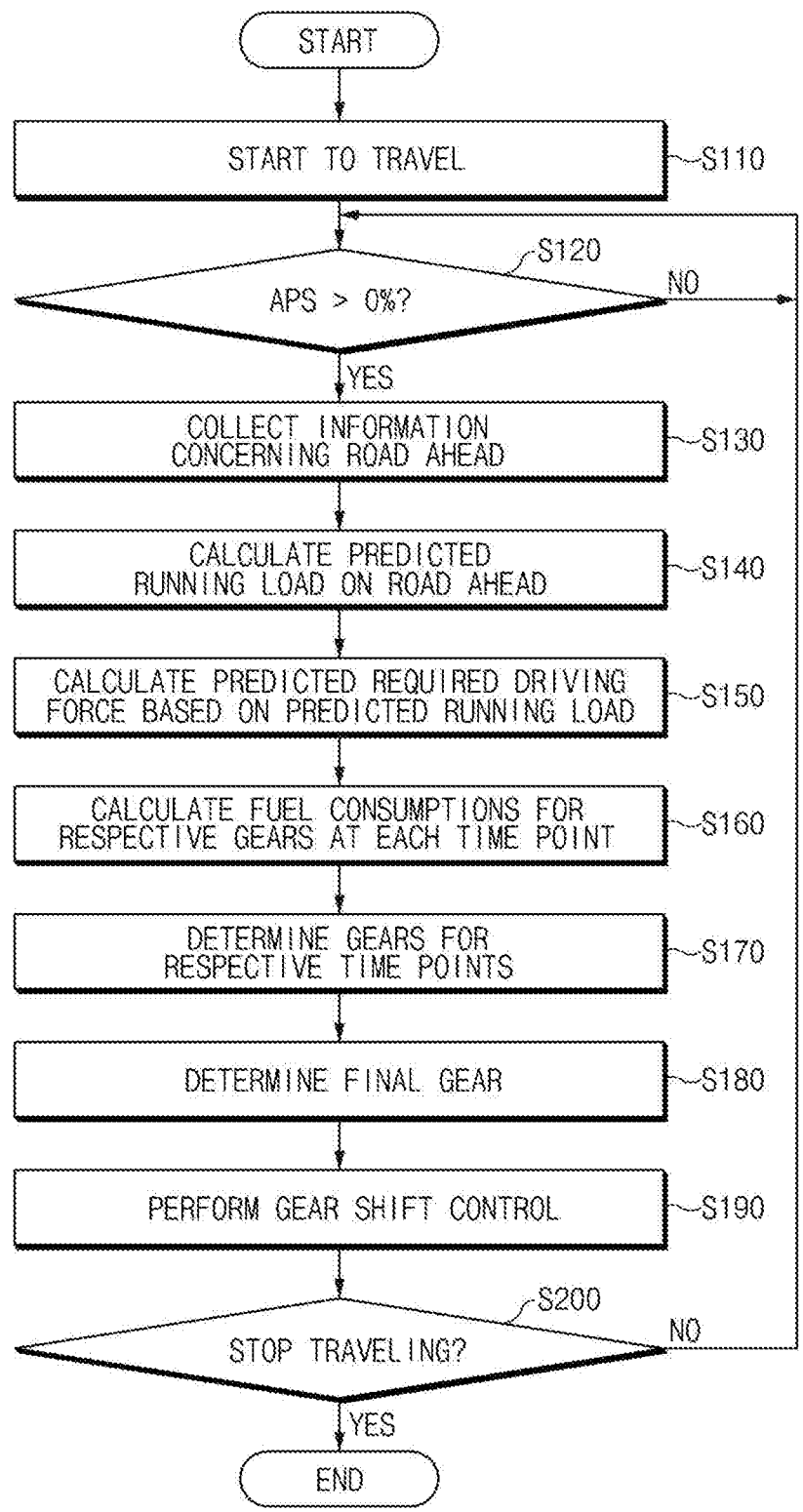
FIG. 8 is a flowchart illustrating a transmission control method for a vehicle according to an exemplary embodiment of the present invention.

FIG. 8 is a flowchart illustrating a transmission control method for a vehicle according to an exemplary embodiment of the present invention.

As illustrated in FIG. 8, when the vehicle 1 starts to travel (Step S110) and the accelerator pedal stroke (APS) exceeds 0% (Step S120), the transmission control apparatus 100 collects information concerning a road ahead, from the navigation device 10 (Step S130). For example, the transmission control apparatus 100 collects information regarding the grade and the curvature of a predetermined section of the road ahead of the vehicle.

The transmission control apparatus 100 determines a predicted running load on the road ahead of the vehicle by use of the information regarding the grade and the curvature, which is collected in step S130 (Step S140), and determines a predicted required driving force, based on the predicted running load determined in step S140 (Step S150). The transmission control apparatus 100 determines predicted running loads and predicted required driving forces for predetermined time points between the current time point and the predicted time point at which the vehicle 1 completely passes through the predetermined section of the road ahead of the vehicle.

The transmission control apparatus 100 determines fuel consumptions for respective gears, based on the predicted required driving force for each time point which is determined in step S150 (Step S160). The transmission control apparatus 100 may determine a gear corresponding to the lowest of the fuel consumptions for the respective gears to be the gear for the corresponding time point. The transmission control apparatus 100 determines gears for the respective time points in the present manner (Step S170).

The transmission control apparatus 100 determines the final gear from the gears for the respective time points that are determined in step S170 (Step S180). In step S180, the transmission control apparatus 100 assigns weighting values to the respective gears for the respective time points and to determine the final gear, based on the average of the gears for the respective time points to which the weighting values are assigned.

Thereafter, the transmission control apparatus 100 performs a gear shift control for the vehicle 1, based on the final gear determined in step S180 (Step S190). Steps S120 to S190 are repeatedly performed until the vehicle 1 stops travelling.

The transmission control apparatus 100 ends the related operation when the vehicle 1 stops travelling (Step S200).

Figure 9:
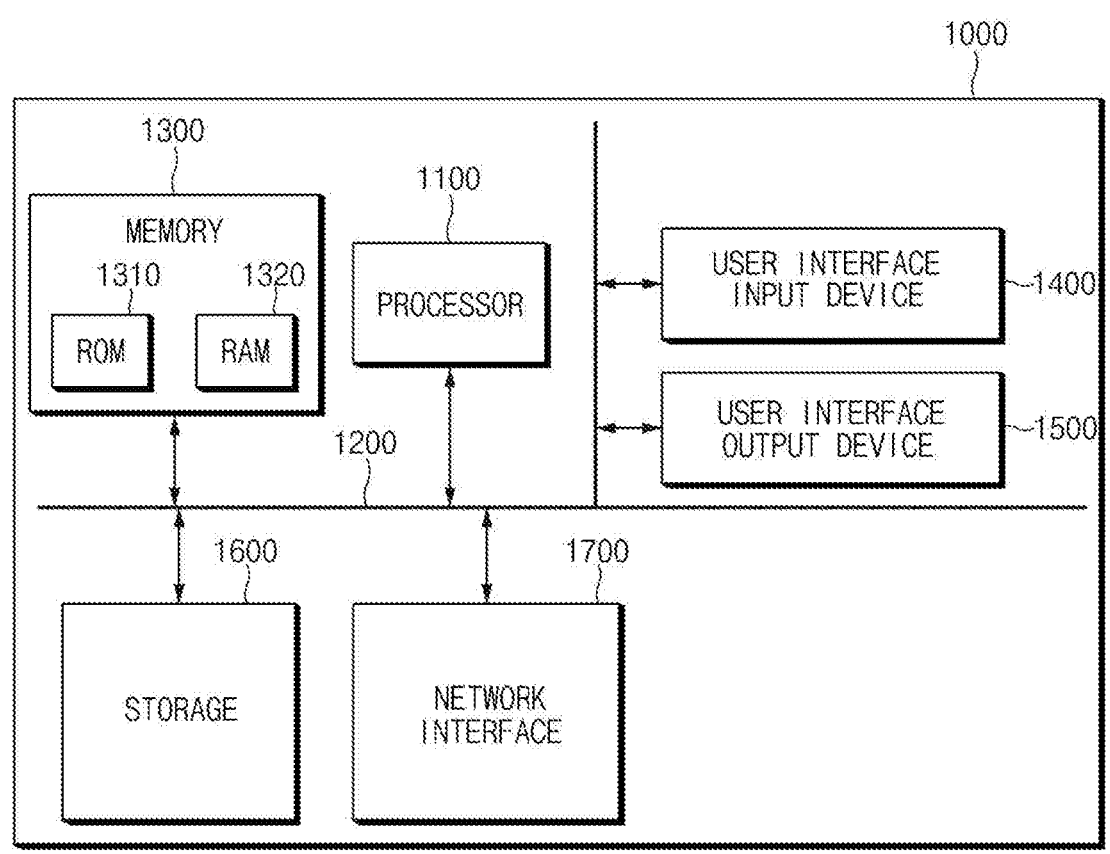
FIG. 9 is a view exemplarily illustrating a determining system in which a method according to an exemplary embodiment of the present invention is executed.

FIG. 9 is a view exemplarily illustrating a determining system in which a method according to an exemplary embodiment of the present invention is executed.

Referring to FIG. 9, a determining system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present invention, the apparatus and method for transmission control of the vehicle and the vehicle system predict the running load and the required driving force according to the grade and/or the curvature of the section of the forward road that the vehicle will reach, and perform the gear shift into the gear corresponding to the lowest fuel consumption, based on the predicted running load and the predicted required driving force, facilitating the vehicle to cope with the condition of the forward road in advance and minimizing busy shift.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for transmission control of a vehicle, the apparatus comprising:
a calculation device configured to determine a predicted running load on a predetermined section of a road ahead of the vehicle by use of information regarding a grade and a curvature of the predetermined section of the road ahead of the vehicle and to determine fuel consumptions for respective gears, based on the predicted running load;
a determination device configured to determine a final gear, based on the determined fuel consumptions for respective gears; and
a controller configured to perform gear shift control for the vehicle, based on the final gear.

2. The apparatus of claim 1, wherein the calculation device is configured to determine a first running resistance according to the grade and a second running resistance according to the curvature and to determine the predicted running load on the predetermined section of the road ahead of the vehicle, from a sum of the first and second determined running resistances.

3. The apparatus of claim 1, wherein the calculation device is configured to predict driving data at a time of travelling on the predetermined section of the road ahead of the vehicle, based on current driving data of the vehicle and to determine the predicted running load, based on the predicted driving data.

4. The apparatus of claim 1, wherein the calculation device is configured to determine predicted running loads for respective predetermined time points between a current time point and a predicted time point at which the vehicle completely passes through the predetermined section of the road ahead of the vehicle.

5. The apparatus of claim 4, wherein the calculation device is configured to determine predicted required driving forces according to the predicted running loads for respective time points.

6. The apparatus of claim 5, wherein the calculation device is configured to determine the fuel consumptions for the respective gears, based on the predicted required driving forces determined for each time point.

7. The apparatus of claim 6, wherein the determination device is configured to determine a gear for a time point, based on the fuel consumptions for the respective gears.

8. The apparatus of claim 7, wherein the determination device is configured to determine a gear corresponding to a lowest of the fuel consumptions for the respective gears to be a gear for a corresponding time point.

9. The apparatus of claim 7, wherein the determination device is configured to assign weighting values to the respective gears for the respective time points and to determine the final gear, based on an average of the respective gears for the respective time points to which the weighting values are assigned.

10. The apparatus of claim 9, wherein the weighting values increase with an approach to the current time point.

11. The apparatus of claim 1, further including:
an information collection device configured to collect the information regarding the grade and the curvature of the predetermined section of the road ahead of the vehicle, from a navigation device.

12. A method for transmission control of a vehicle, the method comprising:
determining, by a control device, a predicted running load on a predetermined section of a road ahead of the vehicle by use of information regarding a grade and a curvature of the predetermined section of the road ahead of the vehicle and determining fuel consumptions for respective gears, based on the predicted running load;
determining, by the control device, a final gear, based on the determined fuel consumptions for the respective gears; and
performing, by the control device, gear shift control for the vehicle, based on the final gear.

13. The method of claim 12, wherein the determining a predicted running load includes:
determining a first running resistance according to the grade and a second running resistance according to the curvature; and
determining the predicted running load on the predetermined section of the road ahead of the vehicle, from a sum of the first and second determined running resistances.

14. The method of claim 12, wherein the determining a predicted running load includes:
predicting driving data at a time of travelling on the predetermined section of the road ahead of the vehicle, based on current driving data of the vehicle and determining the predicted running load, based on the predicted driving data.

15. The method of claim 12, wherein the determining a predicted running load includes:
determining predicted running loads for respective predetermined time points between a current time point and a predicted time point at which the vehicle completely passes through the predetermined section of the road ahead of the vehicle.

16. The method of claim 15, wherein the determining a predicted running load further includes:
determining predicted required driving forces according to the predicted running loads for the respective predetermined time points; and
determining the fuel consumptions for the respective gears, based on the predicted required driving forces determined for each time point.

17. The method of claim 16, wherein the determining a final gear includes:
determining a gear for a time point, based on the fuel consumptions for the respective gears.

18. The method of claim 17, wherein the determining of a gear for the respective predetermined time points includes:
determining a gear corresponding to a lowest of the fuel consumptions for the respective gears to be a gear for a corresponding time point.

19. The method of claim 17, wherein the determining a final gear includes:
assigning weighting values to the respective gears for the respective predetermined time points; and
determining the final gear, based on an average of the respective gears for the respective predetermined time points to which the weighting values are assigned.

20. The method of claim 12, further including:
collecting the information regarding the grade and the curvature of the predetermined section of the road ahead of the vehicle, from a navigation device.

21. A vehicle system comprising:
a navigation device; and
a transmission control apparatus configured to determine a predicted running load on a predetermined section of a road ahead of the vehicle by use of information regarding a grade and a curvature of the predetermined section of the road ahead of the vehicle, the information being collected from the navigation device, to determine a final gear from fuel consumptions for respective gears that are determined based on the determined predicted running load, and to perform gear shift control for the vehicle, based on the final gear.

* * * * *